US006981687B2

(12) United States Patent
    Field

(10) Patent No.: US 6,981,687 B2
(45) Date of Patent: Jan. 3, 2006

(54) BUBBLE-ACTUATED VALVE WITH LATCHING

(75) Inventor: Leslie Ann Field, Portola Valley, CA (US)

(73) Assignee: Cordis Corporation, Miami Lakes, FL (US)

( * ) Notice: Subject to any disclaimer, the term of this patent is extended or adjusted under 35 U.S.C. 154(b) by 71 days.

(21) Appl. No.: 10/763,144

(22) Filed: Jan. 22, 2004

(65) Prior Publication Data

US 2004/0149943 A1    Aug. 5, 2004

Related U.S. Application Data

(60) Provisional application No. 60/441,965, filed on Jan. 23, 2003.

(51) Int. Cl.
    *F16K 31/00* (2006.01)
(52) U.S. Cl. .................................................. 251/11
(58) Field of Classification Search ................ 251/11
    See application file for complete search history.

(56) References Cited

U.S. PATENT DOCUMENTS 5,058,856 A    10/1991  Gordon et al.
6,062,681 A    5/2000   Field et al.
6,283,440 B1 * 9/2001   Evans ........................ 251/11
2003/0057391 A1 * 3/2003 Krulevitch et al. ........... 251/11
2003/0150716 A1 * 8/2003 Hua et al. ................... 204/232
2004/0086872 A1 * 5/2004 Childers et al. .............. 435/6

FOREIGN PATENT DOCUMENTS

WO    WO 01/94823 A    12/2001

OTHER PUBLICATIONS

Papavasiliou, A.P. et al., "High-speed and bi-stable electrolysis bubble actuated gate valves" Proceedings of the 11th International Conference on Solid State Sensors and Actuators Jun. 10, 2001, pp. 940-943 XP002321460, Munich, Germany.
European Search Report EP 04 25 0325 dated Mar. 16, 2005.

* cited by examiner

Primary Examiner—J. Casimer Jacyna
(74) Attorney, Agent, or Firm—Carl J. Evens (57) ABSTRACT

A bubble-actuated valve with latching may be utilized to regulate fluid flow in any number of applications, including the controlled delivery of drugs or other bioactive agents or compounds. The bubble-actuated valve utilizes the bubble to move a solid object that does the actual blocking of the flow channel to regulate the flow of liquid through the valve. The bubble-actuated valve may also include a latching mechanism. One such latching mechanism utilizes the capillary attraction between the solid object and neighboring walls to latch the solid object in place when the valve is not actuated.

25 Claims, 5 Drawing Sheets

BUBBLE-ACTUATED VALVE WITH LATCHING

CROSS REFERENCE TO RELATED APPLICATIONS

This application claims the benefit of U.S. Provisional Application No. 60/441,965 filed Jan. 23, 2003.

BACKGROUND OF THE INVENTION

1. Field of the Invention

The present invention relates to valves, and more particularly, to miniature, latching, low-power valves.

2. Discussion of the Related Art

Microelectromechanical structures (MEMS) and other microengineered devices are currently being developed for a variety of applications because of their size, cost and reliability. Many different varieties of MEMS devices and actuators have been created, including switches, valves, microgears, micromotors and other micromachined devices that are capable of motion or applying force. These MEMS devices may be employed in a variety of applications, including hydraulic applications in which MEMS pumps or valves are utilized, and optical applications in which MEMS light valves and shutters are utilized.

MEMS devices have relied upon various techniques to provide the force necessary to cause the desired motion within these microstructures. For example, cantilevers have been employed to apply mechanical force in order to rotate micromachined springs and gears. In addition, some micromotors are driven by electromagnetic fields, while other micromachined structures are activated by piezoelectric or electrostatic forces. MEMS devices that are actuated by the controlled thermal expansion of an actuator or other MEMS components have also been developed. These thermal actuators may comprise arched beams formed from silicon or metallic materials or combinations thereof that further arch or otherwise deflect when heated, thereby creating motive force. As an additional example of a type of thermally actuated device, thermal inkjet printing may be considered one of the classic applications of MEMS.

In practically every application of MEMS devices, precisely controlled and reliable movement is required. Given the micron scale dimensions associated with MEMS structures, stable and predictable movement characteristics are important. The movement characteristics of MEMS devices can be affected by intrinsic factors such as the type of materials utilized to fabricate the MEMS device, the dimensions and structure of the MEMS device, and the effects of semiconductor process variations. In addition, the movement characteristics of MEMS devices can be affected by extrinsic factors such as fluctuations in the ambient temperature in which the MEMS device operates. The impact of both the intrinsic and extrinsic factors may vary from device to device. For example, while thermally actuated MEMS devices are affected by all of the above factors, they are particularly sensitive to ambient operating temperature variations. Essentially, unless thermal compensation is built into the device or thermal control is incorporated as part of the device packaging, some types of thermally actuated MEMS devices may operate unpredictably or erroneously since the MEMS device will move not only in response to thermal actuation caused by active heating or cooling, but also due to changes in the ambient operating temperature. Therefore, it would be advantageous to develop other types of thermally actuated structures that would operate more reliably or more precisely even when exposed to significant ambient temperature fluctuations. Numerous applications, including switches, relays, variable capacitors, variable resistors, valves, pumps, optical mirror arrays and electromagnetic attenuators would be better served by MEMS structures with these attributes. However, thermal actuators are utilized when necessary.

An inexpensive, miniature, latching, low-power valve for the control of liquid flows is desired for many applications of high commercial interest, for example, drug delivery devices, including implantable medical devices. Prior art valves generally require complicated fabrication and require power to maintain the on or off state (open or closed). Many types of thermally actuated valves are inappropriate for control of liquid flows due to high power requirements because of the thermal conductivity of the liquid. For example, U.S. Pat. No. 5,058,856 describes a thermally actuated valve particularly well suited for application to gas flows, but not liquid flows.

A bubble or liquid/gas interface may be utilized to regulate liquid flow, as described in U.S. Pat. No. 6,062,681. Bubble valves can provide an attractive alternative to a mechanical valve. However, prior art bubble valves often require power, at least periodically, to maintain the off or closed position. In addition, if these valves are utilized to control flow against a significant pressure differential, the maximum flows attainable are often far less than those required in many applications. This is because it is difficult to hold a bubble in position against a significant pressure drop unless a very narrow opening is used to hold the bubble in place. If such a narrow opening is used, then the pressure required for adequate flow through the opening may exceed the system requirements. If, however, the pressure is raised, then this in turn will require a smaller opening to hold the bubble in place, reducing the flow for a given driving pressure, which can be a losing proposition.

A simplified equation for the pressure differential across an interface between a liquid and a gas is given by $$\Delta P = 2\sigma \cos \theta / r,$$

wherein $\Delta P$ is the change in pressure across the interface, $\sigma$ is the surface tension of the liquid, $\theta$ is the interfacial angle between the liquid and an adjoining solid surface, and r is the radius of curvature of the vapor/liquid interface. A simple equation for volumetric flow rate in a cylindrical channel under conditions of laminar flow is given by $$Q = \pi \Delta P R^4 / 8 \mu L,$$

wherein $\Delta P$ is the pressure differential driving the flow given above, R is the radius of a circular channel, $\mu$ is the viscosity of the fluid, and L is the channel length. Even in an application in which the required flow rate is relatively low, such as a medical application, the limitations due to the governing physics can be problematic. For example, in a medical device requiring a flow rate of 1 ml/week, having a thirty-five mm channel length, utilizing an aqueous fluid and a driving pressure of twenty to fifty PSI, the opening needed to maintain a bubble in position would be about an order of magnitude smaller than the overall channel size required.

Accordingly, there exists a need for an accurate, reliable, inexpensive, miniature, latching, low-power valve for the control of liquid flows in a wide variety of applications, including drug delivery devices.

SUMMARY OF THE INVENTION

The present invention overcomes the disadvantages associated with the flow rate limitation typical of prior bubble-based or bubble-actuated valve devices by utilizing the bubble to move another object that does the actual blocking of the flow channel to regulate the flow through the valve. The current invention also maintains latching behavior in the valve by maintaining the object in place even when the power to the device is turned off.

In accordance with one aspect, the present invention is directed to a bubble-actuated valve. The bubble-actuated valve comprises a substrate layer, a cap layer, at least one inlet formed in at least one of the substrate layer and the cap layer, at least one outlet formed in at least one of the substrate layer and the cap layer, at least one flow channel, formed in at least one of the substrate layer and the cap layer, connecting the at least one inlet to the at least one outlet, at least one device for forming a bubble, and a moveable solid object. The moveable solid object being moveable between a first position, wherein fluid flows from the at least one inlet to the at least one outlet, and a second position, wherein fluid flow from the at least one inlet to the at least one outlet is blocked, the moveable solid object being moved by at least one of the bubble and the force generated by the formation of the bubble.

In accordance with another aspect, the present invention is directed to a miniature, bubble-actuated valve. The miniature, bubble-actuated valve comprises a substrate layer, a cap layer, at least one fluid inlet formed in at least one of the substrate layer and the cap layer, at least one fluid outlet formed in at least one of the substrate layer or the cap layer, at least one flow channel, formed in at least one of the substrate layer and the cap layer, connecting the at least one fluid inlet to the at least one fluid outlet, at least one device for creating a bubble, a moveable solid object, the moveable solid object being moveable between a first position, wherein fluid flows from the at least one fluid inlet, and a second position, wherein fluid flow from the at least one fluid inlet to the at least one fluid outlet is blocked, the moveable solid object being moved by at least one of the bubble and the force generated by the creation of the bubble, and a latching mechanism for latching the moveable solid object when the valve is powered down.

In accordance with another aspect, the present invention is directed to a miniature bubble-actuated valve. The miniature, bubble-actuated valve comprises a substrate layer, a cap layer, at least one fluid inlet formed in at least one of the substrate layer and the cap layer, at least one fluid outlet formed in at least one of the substrate layer and the cap layer, at least one flow channel, formed in at least one of the substrate layer and the cap layer, connecting the at least one inlet to the at least one outlet, wherein the at least one inlet and the at least one outlet are in the same plane of the at least one flow channel, at least one device for forming a bubble, and a moveable object, the moveable solid object being moveable between a first position, wherein fluid flows from the at least one inlet to the at least one outlet, and a second position, wherein fluid flow from the at least one inlet to the at least one outlet is blocked, the moveable solid object being moved by at least one of the bubble and the force generated by the formation of the bubble.

In accordance with another aspect, the present invention is directed to a miniature bubble-actuated valve. The valve comprises a substrate layer, a cap layer, at least one fluid inlet formed in at least one of the substrate layer and the cap layer, at least one fluid outlet formed in at least one of the substrate layer and the cap layer, at least one flow channel formed in at least one of the substrate layer and the cap layer, connecting the at least one inlet to the at least one outlet, wherein the at least one inlet and the at least one outlet are out of the plane of the at least one flow channel, at least one device for forming a bubble, and a moveable object, the moveable solid object being moveable between a first position, wherein fluid flows from the at least one inlet to the at least one outlet, and a second position, wherein fluid flow from the at least one inlet to the at least one outlet is blocked, the moveable solid object being moved by at least one of the bubble and the force generated by the formation of the bubble.

In accordance with another aspect, the present invention is directed to a miniature bubble-actuated valve. The valve comprises a substrate layer, an intermediate layer, a cap layer, at least one fluid inlet formed in at least one of the substrate layer, the intermediate layer and the cap layer, at least one fluid outlet formed in at least one of the substrate layer, the intermediate layer and the cap layer, at least one flow channel, formed in at least one of the substrate layer, the intermediate layer and the cap layer, connecting the at least one inlet to the at least one outlet, at least one device for forming a bubble, and a moveable object, the moveable solid object being moveable between a first position, wherein fluid flows from the at least one inlet to the at least one outlet, and a second position, wherein fluid flow from the at least one inlet to the at least one outlet is blocked, the moveable solid object being moved by at least one of the bubble and the force generated by the formation of the bubble.

In accordance with another aspect, the present invention is directed to a valve system. The valve system comprises one or more bubble-actuated valves, each valve including a substrate layer, a cap layer, at least one inlet formed in at least one of the substrate layer and the cap layer, at least one outlet formed in at least one of the substrate layer and the cap layer, at least one flow channel, formed in at least one of the substrate layer and the cap layer, connecting the at least one inlet to the at least one outlet, at least one device for forming a bubble, a moveable object, the moveable solid object being moveable between a first position, wherein fluid flows from the at least one inlet to the at least one outlet, and a second position, wherein fluid flow from the at least one inlet to the at least one outlet is blocked, the moveable solid object being moved by at least one of the bubble and the force generated by the formation of the bubble, and one or more fluid conduits interconnecting the one or more bubble-actuated valves.

In accordance with another aspect, the present invention is directed to a method for controlling fluid flow in a valve. The method comprises forming a first bubble to move a solid object from a first position to a second position, thereby blocking the flow of liquid from the inlet of the valve to the outlet of the valve, and forming a second bubble to move the solid object from the second position to the first position, thereby allowing the flow of liquid from the inlet of the valve to the outlet of the valve.

The miniature bubble-actuated valve of the present invention comprises a substrate layer, a cap layer, one or more fluid inlets, one or more fluid outlets, one or more fluid flow channels, one or more elements for forming a bubble and a moveable solid object. The valve may also comprise an intermediate layer. The one or more fluid inlets, the one or more fluid outlets and the one or more fluid flow channels may be formed in the substrate layer, the cap layer, the intermediate layer or any combination thereof. The one or more elements for forming a bubble may also be incorporated into any of the layers. The various elements may be formed in the same plane of the device or in different planes.

The bubbles may be formed in a number of ways. For example, the bubbles may be formed by nucleation, electrolysis and/or the controlled bleed of a gas from an external gas supply. Nucleation includes thermal nucleation, which involves a phase transformation (liquid to gas) of at least one constituent of the fluid in the valve by the introduction of heat. The heat may be generated in any number of ways, including resistive heaters. Nucleation also includes forming a bubble from the gas or gasses trapped in the fluid. A bubble formed in this way may last longer than a bubble formed through a phase transformation. Electrolysis or the electrolytic formation of a bubble involves breaking certain chemical bonds between various constituents in the fluid by passing a current through the fluid. A common example of this process is the generation of oxygen and hydrogen from water. The use of an external gas simply involves directing a gas under pressure into the fluid in the valve. The external gas may be air. This type of bubble formation may require additional ports in the valve to allow gas delivery. Surface modifications and geometries may also facilitate the formation of bubbles. In addition, surface modifications and valve geometry may allow for sustaining a bubble. With the proper design, the same bubble may be utilized to move the moveable object more than once.

The miniature, bubble-actuated valve of the present invention may be utilized to control fluid flow in a number of ways. For example, the valve may be utilized in a straight on/off mode, in a flow restrictive mode, or in a combination thereof.

The miniature, bubble-actuated valve of the present invention provides a low cost, small size means for precisely controlling fluid flow rates. The construction of the valve requires a simple and inexpensive fabrication process, including the fabrication of devices for bubble formation, such as heaters, sites for electrolytic bubble generation, or sites for inlet gas to form bubbles, flow channels, and inlet and outlet ports on a substrate layer, cap layer or intermediate layer, and a moveable solid object. Given the simple fabrication process, the valve may be produced in volume, thereby reducing the cost of the device. The valve preferably occupies an area of less than 1 mm×1 mm. Given this small size, the valve may be utilized in any number of applications, including drug delivery. The valve utilizes a latching operation and has low power requirements.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

It is known that a bubble, or gas/liquid interface, may be utilized to regulate liquid flow. However, in such regulation of liquid flow with a bubble, limitations on the maximum flow that may be regulated result from the necessity of keeping the bubble in position. The present invention overcomes this limitation on bubble-based or bubble-actuated valve devices by utilizing the bubble to move a solid object that does the actual blocking of the flow channel to regulate the flow of liquid through the valve.

A bubble may be formed or nucleated, for example, by heating the fluid to vaporize liquid water into water vapor, or to nucleate dissolved gas, such as air. The bubble may also be formed electrolytically, or the bubble may be introduced to the valve from an external source of gas or vapor as described above. Device geometry, as described subsequently, may affect bubble formation. For example, if the bubble is formed from an external gas supply, the gas supply port into the valve may be tapered. The bubble formed or introduced by any of these techniques may be utilized to push or move an object into a position to block the liquid flow. The bubble, as well as the force of the initial formation of the bubble, may be utilized to push or move the object. A pressure differential within the device may be utilized to enhance the sealing of the object to minimize leakage.

The bubble may be utilized to move any number of objects depending upon the desired configuration of the valve. For example, the object may comprise a polystyrene or glass sphere, or a substantially spherical object made from any suitable material. In alternate exemplary embodiments, the bubble may be utilized to push a flexible membrane to seal a separate flow channel. The bubble may also be utilized to push a cantilever, bridge, flap or other object, spherical or non-spherical shape, including objects that are rectangular or conical or disk-like, to block or reduce the flow of the liquid through the valve as desired. In other alternate embodiments, the solid object may be transient, for example, ice may be utilized. In addition, any substance that may be converted into a liquid phase may be utilized. In other embodiments, immiscible liquids may be utilized as the moveable object, for example, mercury. In other alternate embodiments, insoluble gases may be utilized as the moveable object.

In addition to utilizing a bubble to move a solid object, the bubble-based valve of the present invention includes a latching mechanism. Capillary attraction between the solid object and neighboring walls may be utilized to latch the solid object in place when the valve is not actuated. A more detailed description of this mechanism, which includes device geometry, is given subsequently.

As set forth above, a simplified equation for the pressure differential across an interface between a liquid and a gas is given by $$\Delta P = 2\sigma \cos \theta / r.$$

As an example, for water, assuming an interfacial angle between the water and an adjoining solid surface $\theta$ of thirty-two degrees and a radius of curvature of the vapor/liquid interface r of 0.5 micrometers, and also assuming a one micrometer gap between the solid object and at least one neighboring wall of the valve, the pressure differential, $\Delta P$, would be roughly thirty-six PSI at the vapor/liquid interface. The generation of this force requires a vapor or gas/liquid interface in the device. In the bubble-based valve of the present invention, a vapor or gas/liquid interface between the solid object and at least one wall of the device can be maintained. A small reservoir of gas may be maintained by proper design of the geometry of the walls neighboring the active area of the device. The presence of this residual gas can provide a gas/liquid interface to provide a force, resulting from the gas/liquid interface being narrowed by the presence of the sphere or other solid object, to latch the sphere in place.

In alternate exemplary embodiments, other modes of latching may be utilized. One such alternate mode of latching involves pressing on the sphere or other moveable object, once it is in position, with a spring or other mechanism or device. This may be achieved, for example, by applying pressure to a flexible portion of the channel adjoining the moveable object. This pressure may be applied by any number of known means, including the presence of a bubble, by pressure from an external gas source on the flexible portion or membrane, or by a shape memory alloy, piezoelectric, thermal, thermal bimetallic, magnetic, or other actuation means.

In yet another alternate exemplary embodiment, physical latching may be provided by designing in a tight fit of the sphere or other moveable object when in position, so that it is energetically unfavorable for the moveable object to change position unless a bubble is present to push the object to the other latching position. With the proper design, the pressure differential of the flow device itself can be used to latch the sphere in the closed position when desired. Furthermore, a tethered object may be designed to preferentially remain in one position unless actuated by the bubble, thus requiring additional latching to be used only in the position when the tether does not enable the latching on its own. In addition, magnetic forces may be utilized to provide latching. Gravity may aid in latching in any of the above-described exemplary embodiments.

Figure 1:
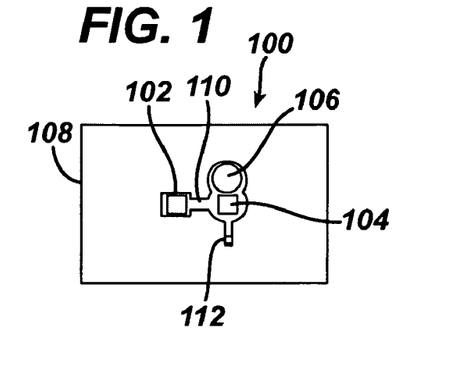
FIG. 1 is a diagrammatic representation of an exemplary embodiment of the bubble-actuated valve with the valve open in accordance with the present invention.

Referring to FIG. 1, there is illustrated a top view of an exemplary embodiment of the bubble-based valve 100 of the present invention. As set forth above, and described in more detail below, the structure of the valve 100 may include a substrate layer, an intermediate layer and a cap layer. In the exemplary embodiments illustrated in FIGS. 1–5, all of the elements of the valve are positioned in the substrate layer for ease of explanation; however, each of the elements may be positioned in any of the layers, or in combinations thereof. In this figure, the valve 100 is in the open position thereby allowing fluid flow from the inlet 102 to the outlet 104. In this exemplary embodiment, the moveable solid object 106 is a sphere. As illustrated, the sphere 106 is in a neutral position thereby allowing the flow of liquid. The valve 100 may be constructed on any suitable substrate layer 108. For example, the substrate 108 may comprise silicon, various polymeric materials, ceramics, and glass. The flow channels 110 may be formed on the substrate layer 108 utilizing any number of materials and processes. For example, the flow channels 110 may be formed on the substrate layer 108 utilizing a polymeric material such as photo-resist in spin-on or laminated form, or by using deposition and etching layers, such as silicon dioxide, with or without doping. In an alternate exemplary embodiment, the flow channels 110 may be etched into the substrate layer 108, or etched in a capping layer or intermediate layer of silicon, polymer, ceramic, glass or the like utilizing any number of known techniques. The nucleation devices, external gas ports or electrolytic devices 112, one of which is illustrated in FIG. 1, utilized for bubble formation, whether it be vapor, gas or a combination thereof, may be formed on the substrate layer 108 utilizing any number of processes, including thin film deposition, patterning, and etching or lift-off. In the exemplary embodiment, the devices for bubble formation are heaters 112 and comprise resistive elements; however, other devices may be utilized. The through-holes may be etched or drilled in the substrate layer 108, the cap layer (not illustrated), the intermediate layer (not illustrated), or all three, by wet etching, laser drilling, or RIE to form the ports for the fluid inlet 102 and the fluid outlet 104 of the bubble valve 100. Alternately, the fluidic connections may be in the active plane of the device, connected to flow channels etched, laminated, deposited or otherwise formed on the substrate layer 108 or other layers.

As stated above, the moveable solid object 106 may comprise a sphere, such as the polystyrene spheres used in flow visualization and biological analyses. Such spheres are available in a variety of sizes and from a variety of manufacturers. Currently available spheres have diameters in the range from about twenty nanometers to about two thousand microns in diameter. These spheres are available in a variety of materials, including, polymer, silica and glass. For a medical device with a flow rate of approximately 1 ml/week and a fifty PSI driving pressure through a 3.5 centimeter channel, an appropriate size for a solid object may be a sphere approximately ten micrometers in diameter. Also as stated above, the moveable solid object 106 may comprise other configurations, for example, non-spherical objects, a tethered object used to seal the inlet or outlet port, including a cantilever, bridge, diaphragm, or other object with at least one end tethered to the substrate, or a bistable object used to seal the inlet or outlet port, for example, a snapping actuator whose snapping is actuated by the generation or presence of one or more bubbles.

Power for the device may be supplied by miniature batteries or by wireless means. The miniature batteries, similar to the batteries utilized by pacemakers, may be incorporated into the valve 100 itself or positioned in proximity to the valve 100. The batteries may be electrically connected or coupled to the bubble generation heaters or electrodes for electrolysis 112 via electrical contacts or via a wireless mechanism. Other devices may be utilized to power the bubble generation heaters 112. For example, piezoelectric or piezoceramic devices may be utilized. The power requirements for the bubble-based valve 100 of the present invention may vary depending on a number of factors, including the desired flow rates, the liquids selected and the heating resistor values selected and the thermal conductivities of the substrate layer, the intermediate layer and the cap layer. In one such exemplary embodiment, using a thermally conductive substrate and an aqueous fluid, the power supply should provide approximately six volts with a 2–200 mW-sec per valve switching event.

The bubble-based valve 100 illustrated in FIG. 1 is a basic design. In other exemplary embodiments, the valve 100 may comprise a multiplicity of inlet and/or outlet ports, a radial configuration of inlet and/or outlet ports and multiple flow channels in a parallel configuration as described in more detail below. In addition, other devices may be integrated with the bubble valve. For example, flow detection devices, pressure sensing devices and bubble position and placement detection devices, for example, optical or capacitive sensors, may be integrated with the bubble-based valve 100 as is known in the control art. These other devices may be part of a closed loop control system for precisely controlling valve function. In addition, as briefly described above, on-chip or off-chip powering and communication circuitry may be integrated with the bubble-based valve.

In other exemplary embodiments, ganging of valves to obtain more complex metering, mixing and flow regulation may be achieved. Such integration may be conveniently accomplished on a single device as is illustrated and described subsequently.

Figure 2:
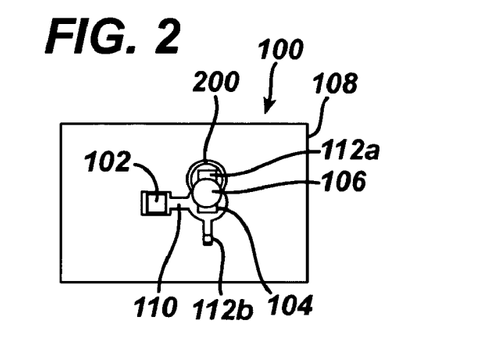
FIG. 2 is a diagrammatic representation of an exemplary embodiment of the bubble-actuated valve with the valve closing in accordance with the present invention.
Figure 3:
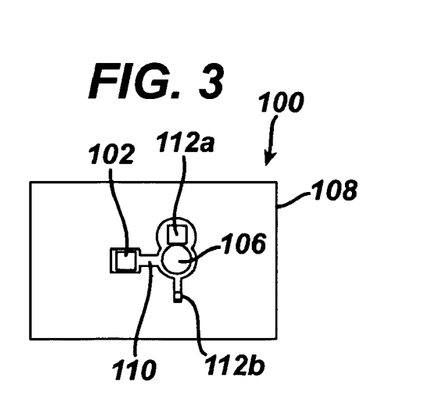
FIG. 3 is a diagrammatic representation of an exemplary embodiment of the bubble-actuated valve with the valve closed in accordance with the present invention.
Figure 4:
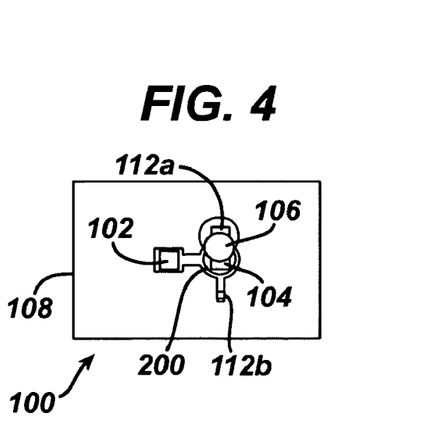
FIG. 4 is a diagrammatic representation of an exemplary embodiment of the bubble-actuated valve with the valve opening in accordance with the present invention.

FIG. 2 illustrates the bubble-based valve 100 in the process of moving to the closed or off position. As illustrated, an energized heater 112*a* nucleates a bubble 200, which in turn causes the moveable solid object 106 to move from the neutral position, illustrated in FIG. 1, towards the liquid outlet 104. As illustrated in FIG. 3, the valve 100 is closed or off when the moveable solid object 106 is sealed to and blocks off the liquid outlet 104. FIG. 4 illustrates the bubble-based valve 100 in the process of moving to the open or on position. As illustrated, an energized heater 112*b* nucleates a bubble 200, which in turn causes the moveable solid object 106 to move from a position blocking the liquid outlet 104 toward a neutral position, as illustrated in FIG. 1.

Figure 5:
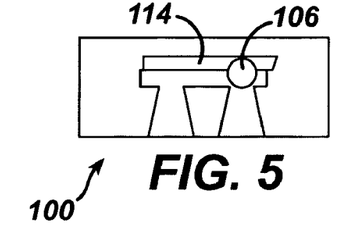
FIG. 5 is a diagrammatic side view of an exemplary embodiment of the bubble-actuated valve in accordance with the present invention.

Referring to FIG. 5, there is a greatly exaggerated side view of the moveable solid object 106 within the bubble valve 100. As illustrated, there is a residual gas or air space 114 to provide the gas or air/liquid interface to provide a force, resulting from the gas/liquid interface being narrowed by the presence of the solid object 106 to latch the object 106 in place.

In one mode of operation, it may be desirable to let the bulk of the actuating bubbles escape through the fluid outlet when actuation has been completed. The outlet port can be sized and flared to enhance this escape. However, to allow the capillary sealing proposed in this invention, it may be desirable to retain some of the gas or vapor from the bubble in a "head space" to form a liquid/gas interface near the moveable object and the wall. It is thought that proper shaping of the flow or holding channel around the moveable object can serve to trap a small amount of gas to achieve this end.

With proper design, the valve 100 may be orientation independent even when using this head space feature, because the capillary forces are stronger than gravitational forces at a sufficiently small scale.

It is important to note that the valve may be formed as a unitary structure rather than from multiple layers. For example, the valve may be formed utilizing an injection molding process.

Figure 6:
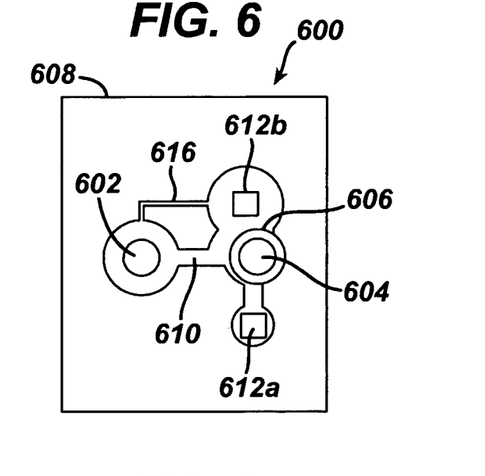
FIG. 6 is a diagrammatic representation of another exemplary embodiment of the bubble-actuated valve with the valve closed in accordance with the present invention.
Figure 7:
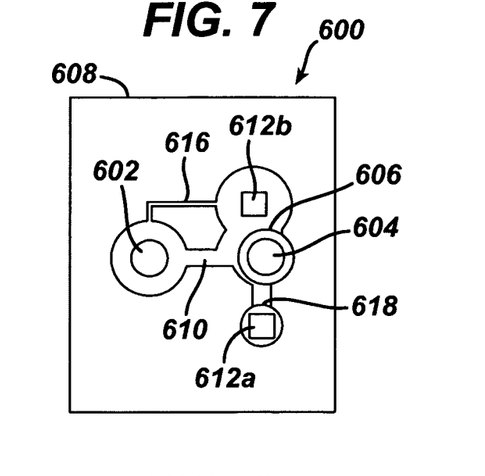
FIG. 7 is a diagrammatic representation of another exemplary embodiment of the bubble-actuated valve with a bubble forming in accordance with the present invention.
Figure 8:
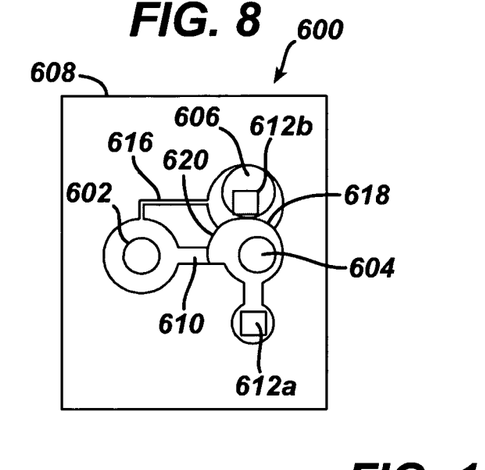
FIG. 8 is a diagrammatic representation of another exemplary embodiment of the bubble-actuated valve with the valve opening in accordance with the present invention.
Figure 9:
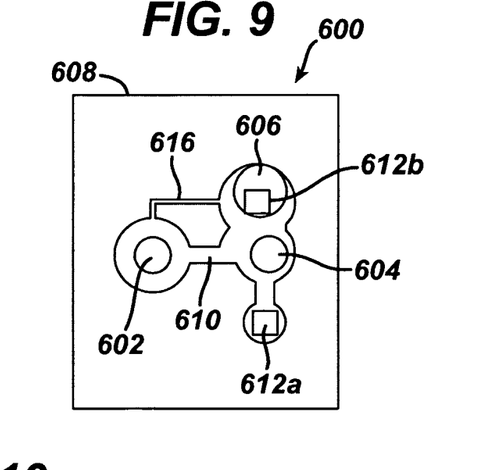
FIG. 9 is a diagrammatic representation of another exemplary embodiment of the bubble-actuated valve with the valve open in accordance with the present invention.
Figure 10:
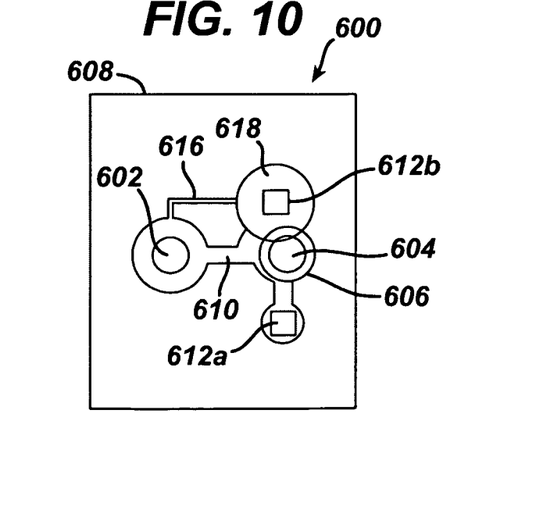
FIG. 10 is a diagrammatic representation of another exemplary embodiment of the bubble-actuated valve with the valve closing in accordance with the present invention.

Referring now to FIGS. 6–10, there is illustrated another alternate exemplary embodiment of the miniature, bubble-actuated valve 600 of the present invention. In this exemplary embodiment, the inlet 602, the outlet 604, the moveable solid object or sphere 606, the devices 612*a, b* for forming a bubble and the flow channel 610 are formed in a single plane, for example, the substrate layer 608. However, as stated above, these elements may be formed or positioned in any of the layers or in a combination of layers as described subsequently. The bubble-actuated valve 600 may also comprise a bleed back channel 616 to allow fluid to move within the valve 600. Essentially, when a bubble is formed, a certain amount of fluid is displaced. The bleed back channel 616 allows the fluid to be displaced from one section or portion of the valve 100 to another. In FIG. 6, the sphere 606 is illustrated as blocking the flow of fluid through the outlet 604. In FIG. 7, a bubble 618 is formed by bubble forming device 612*a*, and as illustrated in FIG. 8, by creating an additional surface 620, the bubble 618 is allowed to grow as large as possible in order to move the sphere 606 as far away from the outlet 604 as possible. In FIG. 9, the flow of fluid is open as the sphere 606 is positioned away from the outlet 604. In FIG. 10, a bubble 618 is formed by bubble forming device 612*b* in order to move the sphere 606 in position over the outlet 604 in order to close or shut off the valve 600.

It is important to note that although the valve is illustrated in either the open/on or closed/off position, the valve may be controlled such that the flow may be restricted rather than completely stopped. In other words, a control system may be designed to precisely control or regulate different flow rates. For example, open and closed loop control systems may be utilized. In addition, different geometries of the flow channels or outlets may be utilized in conjunction with different moveable objects to restrict flow rates rather than on or off flow.

Figure 11A:
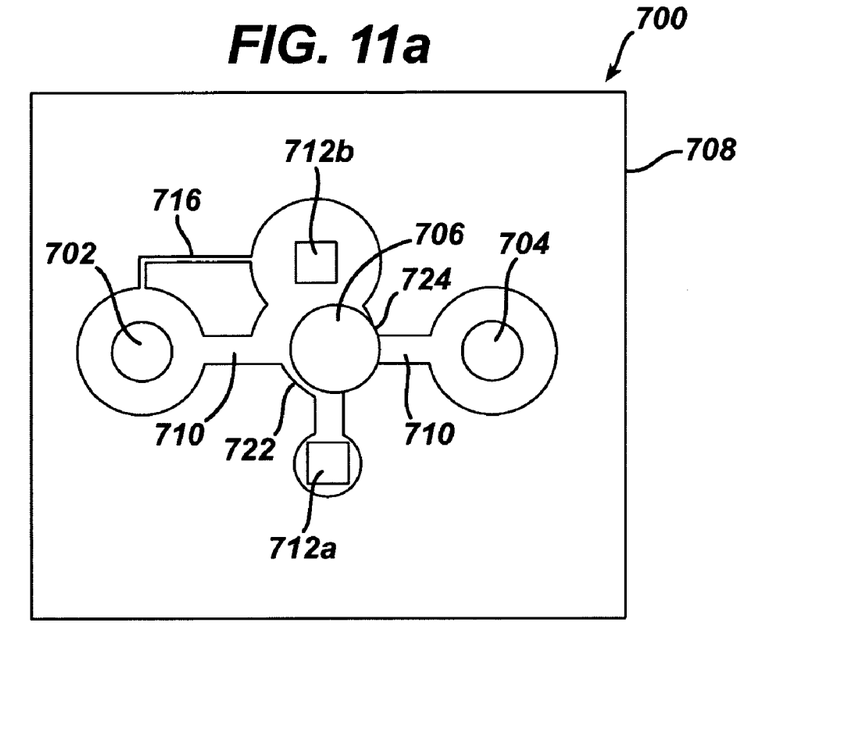
FIGS. 11a and 11b are diagrammatic representations of yet another exemplary embodiment of the bubble-actuated valve in accordance with the present invention.
Figure 11B:
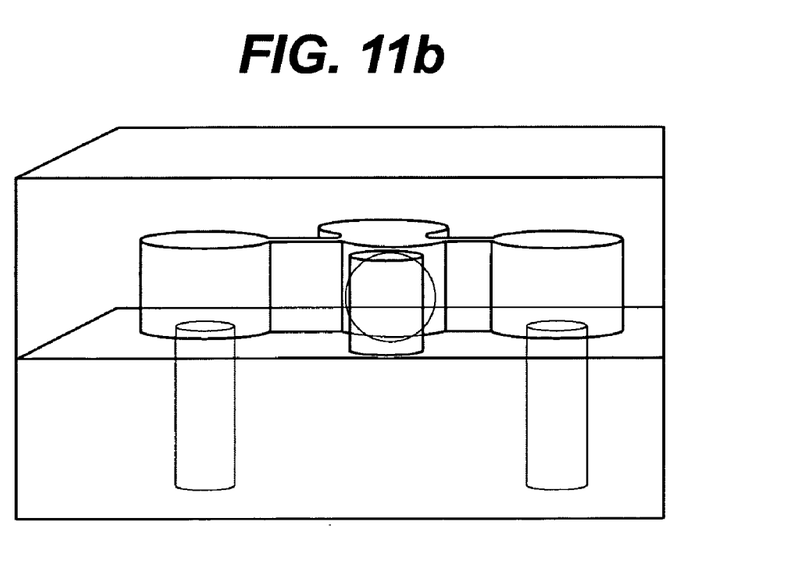

FIGS. 11*a* and 11*b* illustrate yet another alternate exemplary embodiment of the miniature, bubble-actuated valve 700 of the present invention. In this exemplary embodiment, the valve 700 is configured such that the moveable solid object or sphere 706 blocks or partially blocks the flow channel 710 rather than the outlet 704 as is described in the previous exemplary embodiments. In this exemplary embodiment, the flow channel 710 may be configured with various geometries for better fit of the moveable solid object or sphere 706. For example, additional curved surfaces 720, 722 and 724 may be formed in the substrate layer 708, or as described above, in any of the other layers. These curved surfaces may also facilitate latching. This geometry may also be utilized to modify the bubble path.

Figure 12:
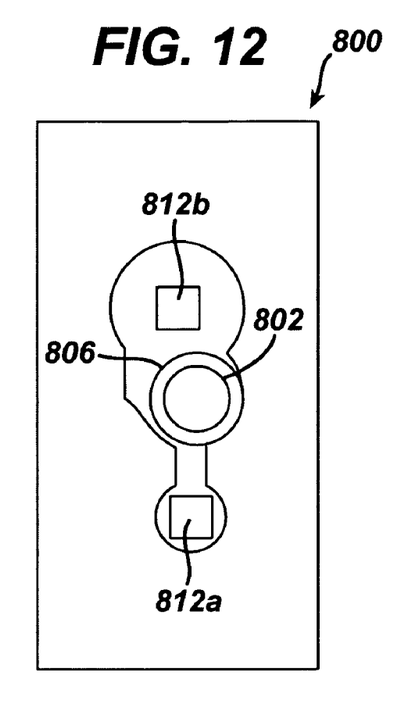
FIG. 12 is a diagrammatic representation of yet another exemplary embodiment of the bubble-actuated valve in accordance with the present invention.
Figure 13:
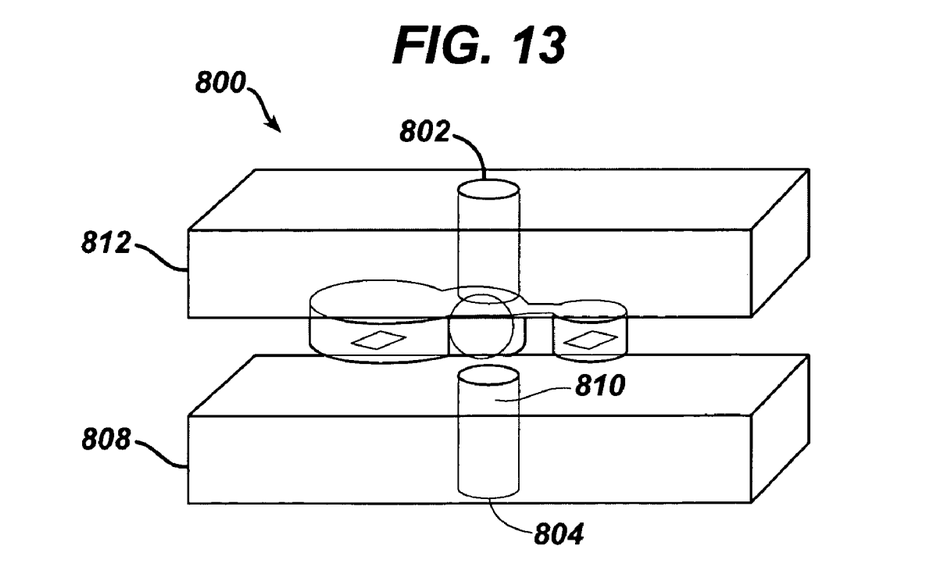
FIG. 13 is a side view of the exemplary embodiment of the bubble-actuated valve illustrated in FIG. 12 in accordance with the present invention.

FIGS. 12 and 13 illustrates yet another alternate exemplary embodiment of the miniature, bubble-actuated valve 800 of the present invention. In this exemplary embodiment, the inlet 802 and the outlet 804 are in different planes. In other words, the outlet 804 may be formed in the substrate layer 808 and the inlet 802 formed in the cap layer 812 or vice versa. Accordingly, the flow channel 810 is between two planes of the valve 800 as illustrated clearly in FIG. 13. In addition, the valve 800 comprises nucleation devices 812*a* and *b*.

Figure 14:
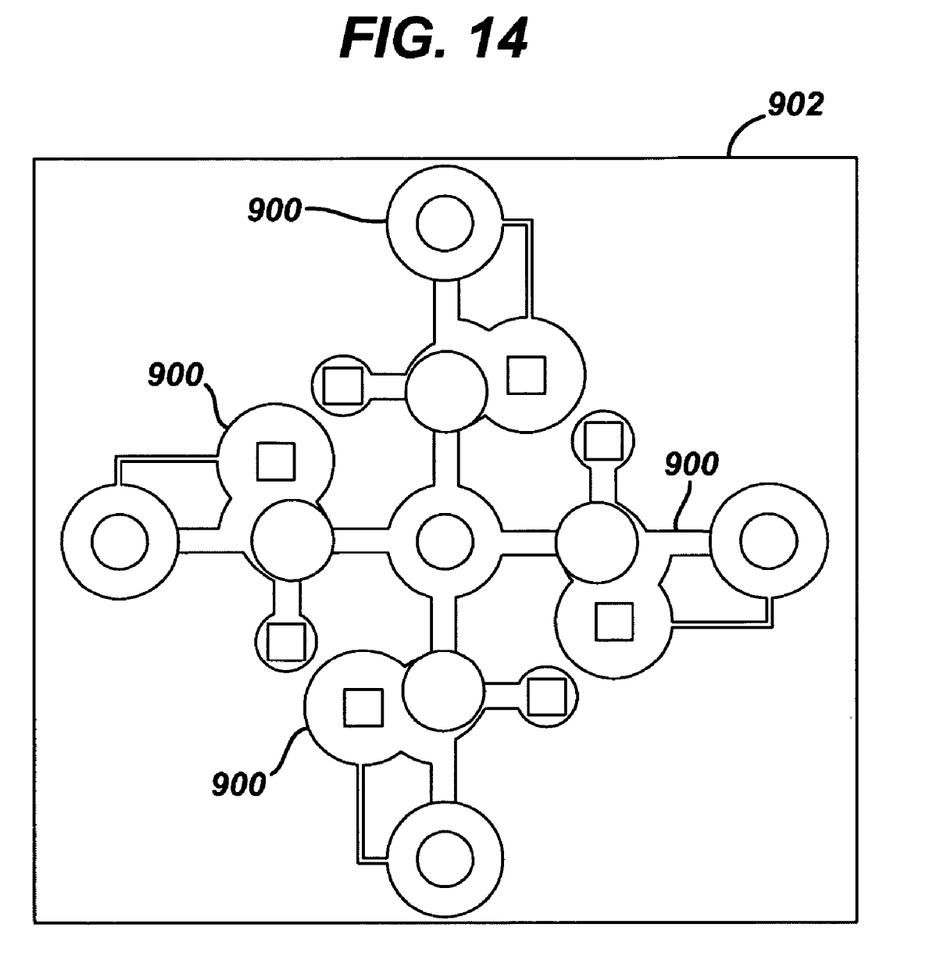
FIG. 14 is a diagrammatic representation of an exemplary embodiment of a valve system incorporating bubble-actuated valves in accordance with the present invention.

FIG. 14 illustrates an exemplary embodiment of a radial ganging arrangement of miniature, bubble-actuated valves 900 which may be utilized for any number of applications. Essentially, FIG. 14 illustrates a valve system 902. Any number of ganging arrangements may be utilized to regulate flow for any particular applications. In addition, the valves 900 may be configured in a modular design such that various arrangements may be achieved rapidly and inexpensively.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A bubble-actuated valve comprising:
   a substrate layer;
   a cap layer;
   at least one inlet formed in at least one of the substrate layer and the cap layer;
   at least one outlet formed in at least one of the substrate layer and the cap layer;
   at least one flow channel, formed in at least one of the substrate layer and the cap layer, connecting the at least one inlet to the at least one outlet;
   at least one device for forming a bubble; and
   a moveable solid object, the moveable solid object being moveable between a first position, wherein fluid flows from the at least one inlet to the at least one outlet, and a second position, wherein fluid flow from the at least one inlet to the at least one outlet is blocked, the moveable solid object being moved by at least one of the bubble and the force generated by the formation of the bubble, the moveable solid object comprises a spherical element.

2. The bubble-actuated valve according to claim 1, wherein the at least one device for forming a bubble is a heating element affixed to at least one of the substrate layer or the cap layer.

3. The bubble-actuated valve according to claim 1, wherein the substrate layer comprises silicon.

4. The bubble-actuated valve according to claim 1, wherein the substrate layer comprises a polymeric material.

5. The bubble-actuated valve according to claim 1, wherein the substrate layer comprises a ceramic material.

6. The bubble-actuated valve according to claim 1, wherein the substrate layer comprises glass.

7. The bubble-actuated valve according to claim 1, wherein the cap layer comprises silicon.

8. The bubble-actuated valve according to claim 1, wherein the cap layer comprises a polymeric material.

9. The bubble-actuated valve according to claim 1, wherein the cap layer comprises a ceramic material.

10. The bubble-actuated valve according to claim 1, wherein the cap layer comprises glass.

11. A miniature, bubble-actuated valve comprising:
    a substrate layer;
    a cap layer;
    at least one fluid inlet formed in at least one of the substrate layer and the cap layer
    at least one fluid outlet formed in at least one of the substrate layer and the cap layer;
    at least one flow channel, formed in at least one of the substrate layer and the cap layer, connecting the at least one fluid inlet to the at least one fluid outlet;
    at least one device for creating a bubble;
    a moveable solid object, the moveable solid object being moveable between a first position, wherein fluid flows from the at least one fluid inlet to the at least one fluid outlet, and a second position, wherein fluid flow from the at least one fluid inlet to the at least one fluid outlet is blocked, the moveable solid object being moved by at least one of the bubble and the force generated by the creation of the bubble, the moveable solid object comprises a spherical element; and
    a latching mechanism for latching the moveable solid object when the valve is powered down.

12. The miniature, bubble-actuated valve according to claim 11, wherein the substrate layer comprises silicon.

13. The miniature, bubble-actuated valve according to claim 11, wherein the substrate layer comprises a polymeric material.

14. The miniature, bubble-actuated valve according to claim 11, wherein the substrate layer comprises a ceramic material.

15. The miniature, bubble-actuated valve according to claim 11, wherein the substrate layer comprises glass.

16. The miniature, bubble-actuated valve according to claim 11, wherein the cap layer comprises silicon.

17. The miniature, bubble-actuated valve according to claim 11, wherein the cap layer comprises a polymeric material.

18. The miniature, bubble-actuated valve according to claim 11, wherein the cap layer comprises a ceramic material.

19. The miniature, bubble-actuated valve according to claim 11, wherein the cap layer comprises glass.

20. The miniature, bubble-actuated valve according to claim 11, wherein the at least one device for creating a bubble comprises a heating element positioned in at least one of the substrate layer and the cap layer.

21. The miniature, bubble-actuated valve according to claim 20, wherein the heating element is a resistive heating element.

22. The miniature, bubble-actuated valve according to claim 11, wherein the at least one device for creating a bubble comprises an electrolytic device operatively associated with at least one of the substrate layer and the cap layer.

23. The miniature, bubble-actuated valve according to claim 11, wherein the at least one device for creating a bubble comprises a gas supply operatively associated with at least one of the substrate layer and the cap layer.

24. The miniature, bubble-actuated valve according to claim 11, wherein the latching mechanism comprises a small gas reservoir in at least one of the substrate layer and the cap layer.

25. The miniature, bubble-actuated valve according to claim 11, wherein the latching mechanism comprises a latching actuator.

* * * * *